(12) United States Patent
Heya et al.

(10) Patent No.: US 6,299,241 B1
(45) Date of Patent: Oct. 9, 2001

(54) CAR BODY STRUCTURE

(75) Inventors: Syusaku Heya; Fumito Ueyanagi, both of Tokyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/297,192

(22) PCT Filed: Sep. 28, 1998

(86) PCT No.: PCT/JP98/04319

§ 371 Date: Apr. 27, 1999

§ 102(e) Date: Apr. 27, 1999

(87) PCT Pub. No.: WO99/16656

PCT Pub. Date: Apr. 8, 1999

(30) Foreign Application Priority Data

Sep. 30, 1997 (JP) .................................................... 9-265639

(51) Int. Cl.[7] ................... B60J 5/06; E05F 11/00
(52) U.S. Cl. ....................... 296/203.03; 296/155
(58) Field of Search .................. 296/155, 210, 296/203.03; 49/360

(56) References Cited

U.S. PATENT DOCUMENTS

| | | | |
|---|---|---|---|
| 2,866,663 | * 12/1958 | Ashford | 296/155 |
| 4,152,872 | * 5/1979 | Tanizaki et al. | 296/155 |
| 4,544,198 | * 10/1985 | Ochiai et al. | 296/155 |
| 4,976,488 | * 12/1990 | Asai et al. | 296/155 |

FOREIGN PATENT DOCUMENTS

| | | | |
|---|---|---|---|
| 3325297 | * 1/1984 | (DE) | 296/155 |
| 59-34924 | * 2/1984 | (JP) | 296/155 |
| 61-139516 | * 6/1986 | (JP) | 296/155 |
| 61-285120 | * 12/1986 | (JP) | 296/155 |
| 2-60825 | * 3/1990 | (JP) | 296/155 |

* cited by examiner

Primary Examiner—D. Glenn Dayoan
Assistant Examiner—Hilary Gutman

(57) ABSTRACT

A vechile body structure which increases the strength and rigidity of side roof rails, and improves sealability of a between a slide door and a vehicle body is provided. A side roof rail is composed of an outer side roof rail panel and an inner side roof rail panel. An upper rail is disposed more inwardly in the vechile body than a lower weld flange at which the outer side roof rail panel and the inner side roof rail panel are bonded together. Thus, an abrupt change in the cross section of the side roof rail can be avoided.

5 Claims, 5 Drawing Sheets

CAR BODY STRUCTURE

This application is the national phase under 35 U.S.C. § 371 of PCT International Application No. PCT/JP98/04319 which has an International filing date of Sep. 28, 1998, which designated the United States of America.

TECHNICAL FIELD

This invention relates to a roof side structure of a vehicle having a slide door.

BACKGROUND ART

This type of vehicle body structure which exist is shown, for example, in FIGS. 4 and 5.

According to the illustrated structure, an upper rail 103 for guiding a slide door 100 via a roller 101 so as to be openable and closable in a back-and-forth direction of a vehicle body 102 is assembled by welding or the like to an outer side roof rail panel 105 which constitutes a side roof rail 104. An area of the upper rail 103 ranging from a general part (see FIG. 4) to a front part (see FIG. 5) bends toward a vehicle compartment. In the drawing, the reference numeral 106 denotes a weather strip for sealing up a gap between the slide door 100 and the vehicle body 102. The reference numeral 107 denotes a roof panel.

With the above-described conventional vehicle body structure, the upper rail 103 is shaped such that its front side bends toward the vehicle compartment. Thus, the side roof rail 104 requires a markedly curved shape. In other words, its cross section abruptly changes, so that it is difficult to ensure the strength and rigidity of the side roof rail 104 against collision and driving stability of the vehicle.

Furthermore, the upper rail 103 is assembled to the outer side roof rail panel 105 of the side roof rail 104. This makes it difficult to provide at this site of assembly a sealing portion between the slide door 100 and the vehicle body 102. Thus, dirt or dust that has penetrated the space at this site adheres to the upper rail 103 or the roller 101. As a result, a feeling of the door during rolling movement of the slide door 100 diminishes, and a wind noise when vechile moves occurs because of wind penetrating that space. Moreover, it becomes necessary to apply a sealer at junctions between the outer side roof rail panel 105 and other panels. To apply this sealer is difficult to do.

A car model adopting a roof moulding structure, on the other hand, involves the following problem: As stated earlier, the side roof rail 104 takes a shape in which a part of it is markedly bent toward the vehicle compartment side. This configuration impedes continuous spot welding.

An object of the present invention is to provide a vehicle body structure which increases the strength and rigidity of a side roof rail, and improves sealability between a slide door and a vehicle body.

DISCLOSURE OF THE INVENTION

To attain the above object, the present invention provides a vehicle body structure having an opening formed at a side surface of a vehicle body, an upper rail and a lower rail provided, respectively, above and below a vehicle body constituent member forming the opening and extending in a back-and-forth direction of a vehicle, and a slide door, supported movably on the upper and lower rails, for moving in the back-and-forth direction of the vehicle and covering or uncovering the opening, the vehicle body structure comprising:

side roof rails each composed of an outer side roof rail panel and an inner side roof rail panel provided at each of right and left ends of an upper portion of the vehicle body, the outer side roof rail panel being located at each of right and left sides of an upper surface of the vehicle body, extending in the back-and-forth direction of the vehicle, and being formed to have a concave cross section, and the inner side roof rail panel being located below the outer side roof rail panel, and having end portions, in a vehicle width direction, bonded to end portions of the outer side roof rail panel to form a closed cross sectional structure; and a roof panel bonded to a vehicle compartment side end portion of each of the right and left side roof rails along with the outer side roof rail panel and the inner side roof rail panel to constitute a roof together with the side roof rails, the upper rail being located more inwardly in the vehicle body than a junction between the outer side roof rail panel and the inner side roof rail panel and attached to the inner side roof rail panel, the junction being located at an outer position of the vehicle body.

According to the above-described constitution, the upper rail for guiding the slide door so as to be openable and closable in the back-and-forth direction is provided closer to the vehicle compartment side than the junction between the outer side roof rail panel and the inner side roof rail panel that constitute each of the side roof rails of roof sides extending in the back-and-forth direction of the vehicle body. Consequently, an abrupt change in the cross section of the side roof rail can be avoided, and outer sealing can be achieved.

Besides, the inner side roof rail panel has a horizontal plate portion extending horizontally from the outside of the vehicle compartment toward the vehicle compartment, and a vertical plate portion continued from the horizontal plate portion and erected upwards.

A bracket has an end portion outside the vehicle compartment attached to the horizontal plate portion of the inner side roof rail panel, and an end portion beside the vehicle compartment attached to the upper rail.

A cover has an upper end portion attached to the vertical plate portion of the inner side roof rail panel, and a lower end portion extending so as to surround the upper rail and the bracket.

As a result, the cover is provided closer to the vehicle compartment than the upper rail to shut the upper rail and the vehicle compartment off from each other.

BEST MODE FOR CARRYING OUT THE INVENTION

A vehicle body structure according to the present invention will now be described in detail by way of an Example with reference to the accompanying drawings.

EXAMPLE

Figure 1:
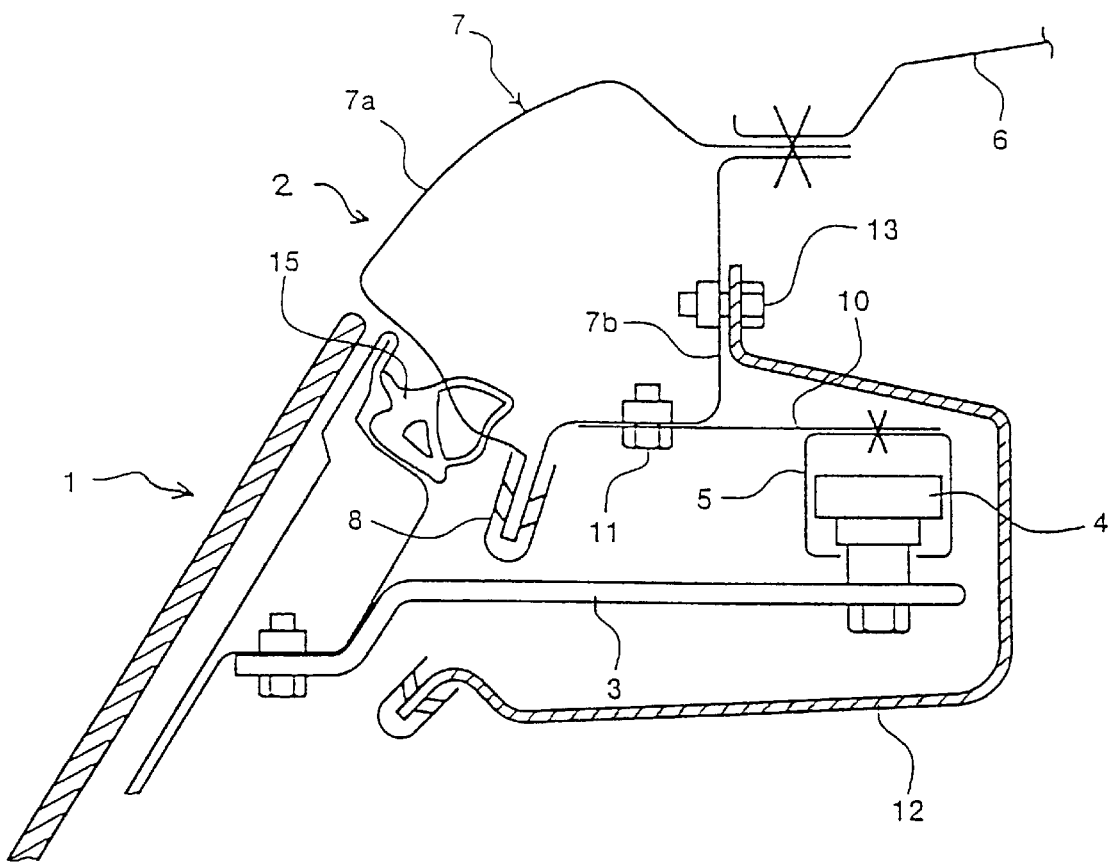
FIG. 1 shows a front portion of an upper rail according to an embodiment of the present invention, as a sectional view taken on line A—A of FIG. 3.
Figure 2:
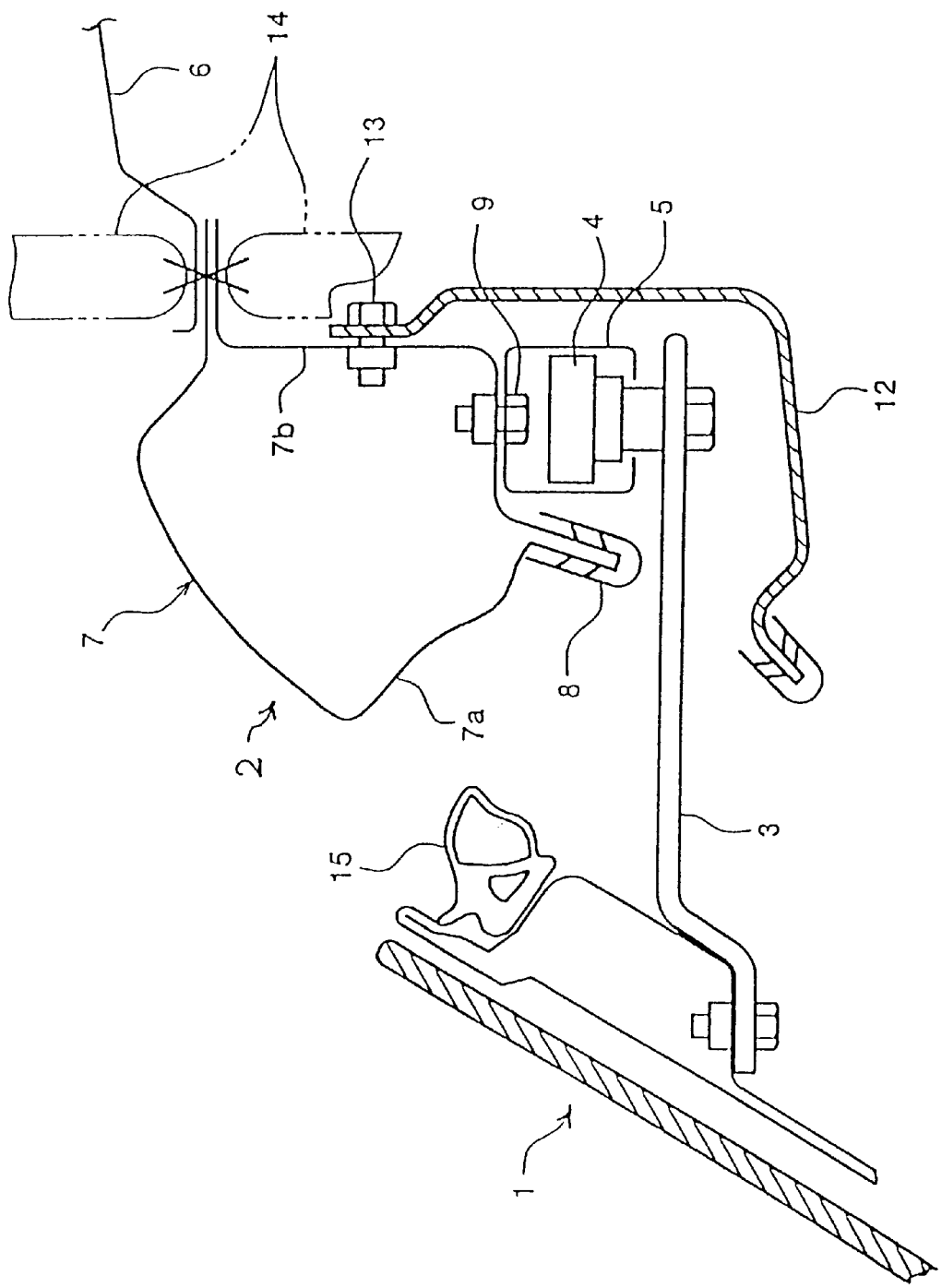
FIG. 2 shows a general portion of the upper rail according to the embodiment of the present invention, as a sectional view taken on line B—B of FIG. 3.
Figure 3:
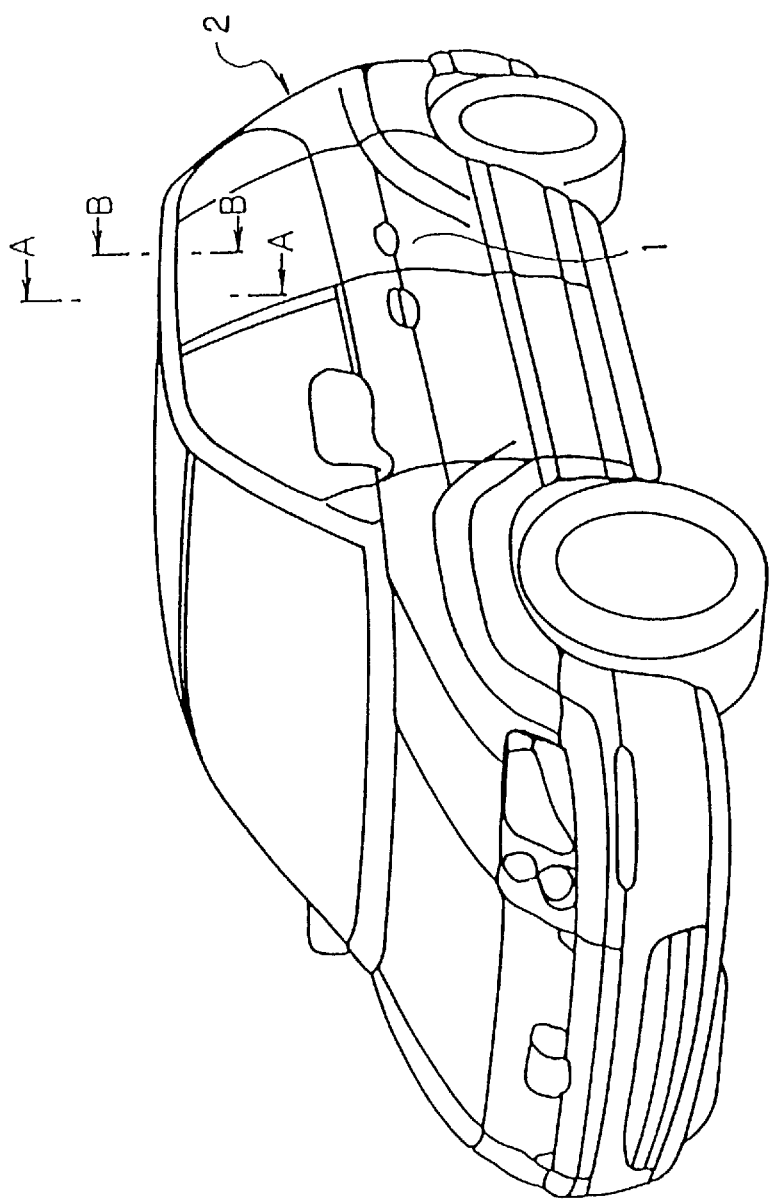
FIG. 3 is a perspective view of a vehicle with a slide door.
Figure 4:
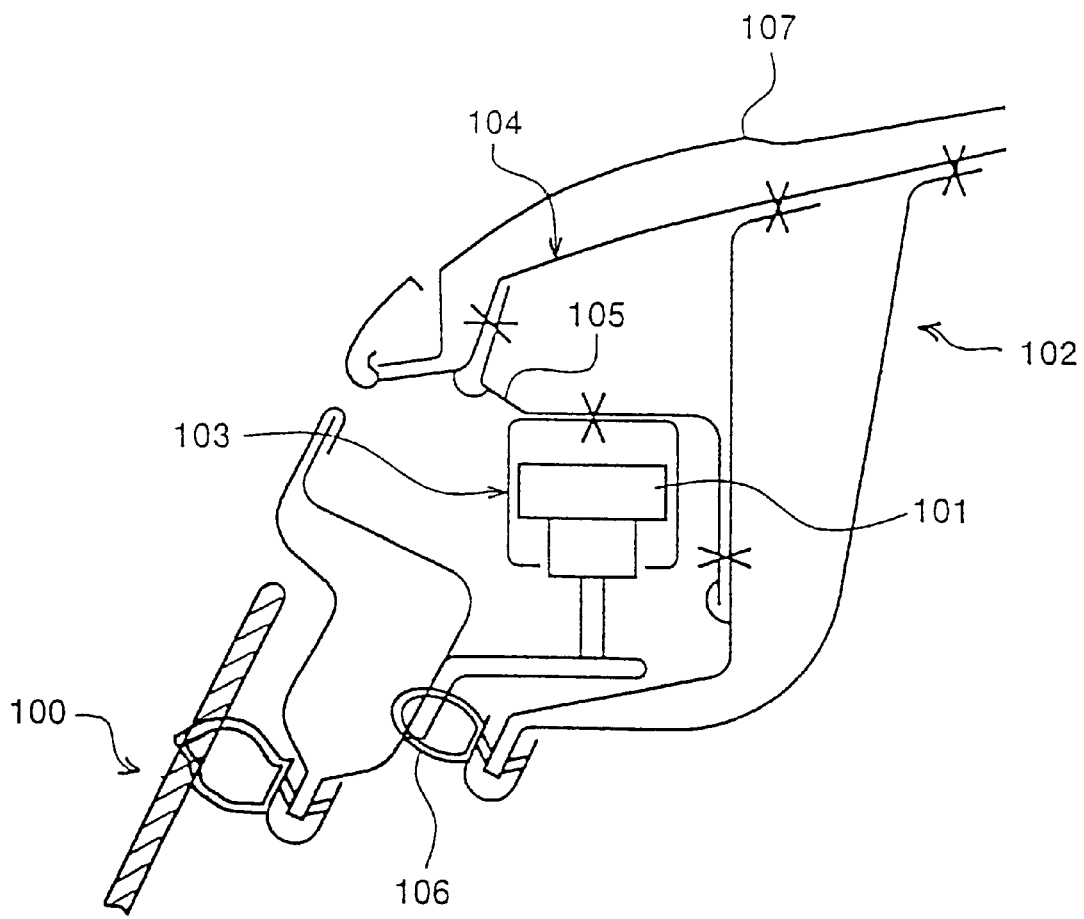
FIG. 4 is a sectional view of a general portion of a conventional upper rail.
Figure 5:
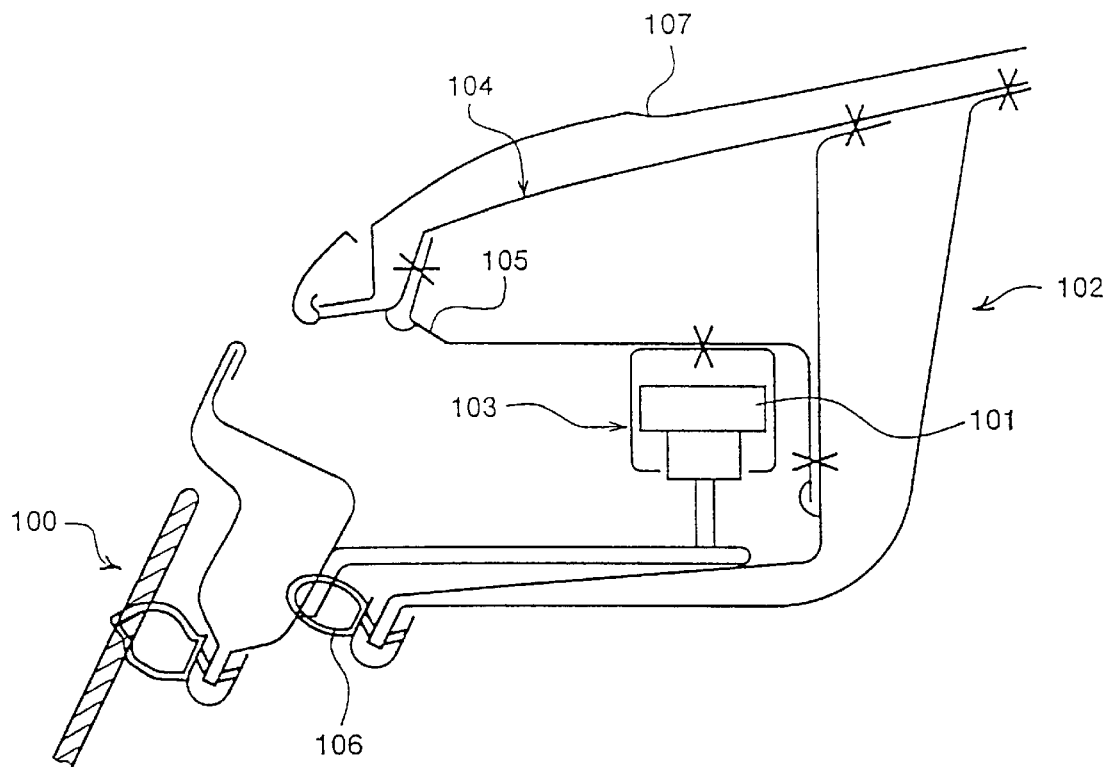
FIG. 5 is a sectional view of a front portion of the conventional upper rail.

FIG. 1 shows a front portion of an upper rail according to an embodiment of the present invention, as a sectional view taken on line A—A of FIG. 3. FIG. 2 shows a general portion of the upper rail according to the embodiment of the present invention, as a sectional view taken on line B—B of FIG. 3. FIG. 3 is a perspective view of a vehicle with a slide door As shown in FIG. 3, a vehicle with a slide door may have a rear door 1 sliding in a back-and-forth direction of a vehicle body 2 so as to be openable and closable.

That is, a roller 4 is supported by a bracket 3 located in each of a front portion and a rear portion at an internal side of an upper edge portion of the rear door 1. The roller 4 can move rollingly inside an upper rail 5 extending in the back-and-forth direction of an upper side portion of the vehicle body 2. An internal side of an intermediate portion or a lower edge portion of the rear door 1 is also adapted to be guided by a lower rail (not shown) extending in the back-and-forth direction of an intermediate portion or a lower side portion of the vehicle body 2, although this constitution is not mentioned in detail herein.

The upper rail 5 is provided nearer to a vehicle compartment than a side roof rail 7 extending along a side edge of a roof panel 6 of the vehicle body 2, as shown in FIGS. 1 and 2.

In detail, the side roof rail 7 is composed of an outer side roof rail panel 7a and an inner side roof rail panel 7b in the back-and-forth direction of the vehicle body 2 so as to have a closed cross section. The upper rail 5 is attached to a horizontal wall portion of the inner side roof rail panel 7b situated nearer to the vehicle compartment than a lower weld flange (see a moulding 8 in the drawing) at which the outer side roof rail panel 7a and the inner side roof rail panel 7b are bonded together.

In the illustrated embodiment, a general portion of the upper rail 5 is bonded by a bolt 9 to the inner side roof rail panel 7b (see FIG. 2). A front side of the upper rail 5 is bent toward the vehicle compartment, and supported by the inner side roof rail panel 7b via a bracket 10 (see FIG. 1).

The bracket 10 is joined to the inner side roof rail panel 7b by a bolt 11, and bonded to the upper rail 5 by welding.

To a vertical wall portion of the inner side roof rail panel 7b, a cover 12 is attached by a bolt 13 so as to cover and hide the upper rail 5.

To an upper weld flange at which the outer side roof rail panel 7a and the inner side roof rail panel 7b are bonded together, a side edge portion of the roof panel 6 is welded using a spot welding gun 14. A moulding (not shown) is to be applied to a surface of the side edge portion.

The reference numeral 15 represents a weather strip for sealing a gap between the rear door 1 and the vehicle body 2. The weather strip forms a sealing surface below the outer side roof rail panel 7a.

According to the present embodiment, as noted above, the upper rail 5 is provided more inwardly in the vehicle body than the lower weld flange at which the outer side roof rail panel 7a and the inner side roof rail panel 7b are bonded together. Even at a site where the front side of the upper rail 5 is bent toward the vehicle compartment, therefore, the use of the bracket 10 obviates the need to change the cross section of the side roof rail 7.

Thus, the strength of the side roof rail 7 required at the collision of the front or side surface of the vehicle is improved, and the rigidity of the outer side roof rail panel 7a required to ensure driving stability is also improved.

Furthermore, the side roof rail 7 is shaped so as not to protrude or depress in the vehicle width direction, so that the appearance of the vehicle when the rear door 1 is opened is improved.

Also, the sealing surface is established below the outer side roof rail panel 7a to achieve so-called outer sealing. Thus, dirt or dust can be prevented from penetrating the site of the upper rail 5. As a result, wind noise that occurs when the vechile moves can be decreased, and a diminished feeling of the door during rolling movement of the rear door 1 can be avoided.

Moreover, the side roof rail 7 does not take a shape in which a part of it is markedly curved toward the vehicle compartment. Thus, the side edge portion of the roof panel 6 can be easily welded by means of the spot welding gun 14 to the upper weld flange at which the outer side roof rail panel 7a and the inner side roof rail panel 7b are bonded together. A so-called roof moulding structure can be easily attained.

In addition, the cover 12 is attached to the vertical wall portion of the inner side roof rail panel 7b so as to cover and hide the upper rail 5. Thus, the vehicle compartment and the upper rail 5 can be effectively shut off from each other in terms of appearance and structure.

The present invention is not restricted to the above embodiment, and needless to say, various changes and modifications, such as those in the shapes of and materials for the various members, can be made without departing from the gist of the invention.

According to the present invention, as described above, the upper rail for guiding the slide door in the back-and-forth direction so as to be openable and closable is provided closer to the vehicle compartment than the side roof rail of the roof side extending in the back-and-forth direction of the vehicle body. Consequently, an abrupt change in the cross section of the side roof rail can be avoided, and outer sealing can be performed. Thus, the strength and rigidity of the side roof rail can be improved, wind noise during movement of the vehicle can be decreased, and a feeling of the door during rolling movement of the slide door can be improved.

Besides, the upper rail is provided more inwardly in the vehicle body than the lower weld flange at which the outer side roof rail panel and the inner side roof rail panel are bonded together. Thus, the aforementioned actions and effects can be obtained by more concrete means.

In addition, the cover is provided nearer to the vehicle compartment than the upper rail. Thus, the upper rail and the vehicle compartment can be shut off from each other effectively.

INDUSTRIAL APPLICABILITY

As described above, the vehicle body structure of the present invention is constituted such that the upper rail for guiding the slide door in the back-and-forth direction so as to be openable and closable is provided closer to the vehicle compartment than the junction between the outer side roof rail panel and the inner side roof rail panel that constitute the side roof rail of the roof side extending in the back-and-forth direction of the vehicle body. Consequently, an abrupt change in the cross section of the side roof rail can be avoided, and outer sealing can be performed. This vehicle body structure is preferred for use in a one box car having a slide door.

What is claimed is:

1. A vehicle body having an opening formed at a side surface of the vehicle body, an upper rail provided above the vehicle body forming in part the opening and extending in a back-and-forth direction of a vehicle, and a slide door, supported movably at least on the upper rail, for moving in the back-and-forth direction of the vehicle and covering or uncovering the opening, said vehicle body comprising:

side roof rails each composed of an outer side roof rail panel and an inner side roof rail panel provided at each of right and left ends of an upper portion of the vehicle body, said outer side roof rail panel being located at each of right and left sides oi an upper surface of the vehicle body, extending in the back-and-forth direction of the vehicle, and being formed to have a concave cross section, and said inner side roof rail panel being located below the outer side roof rail panel, and having end portions, bonded to end portions of the outer side roof rail panel to form a closed cross sectional structure; and a roof panel bonded to a vehicle compartment side end portion of each of the right and left side roof rails along with the outer side roof rail panel and the inner side roof rail panel to constitute a roof together with the side roof rails, said upper rail being located more inwardly in the vehicle body than a junction between the outer side roof rail panel and the inner side roof rail panel and attached to the inner side roof rail panel, said junction being located at an outer position of the vehicle body, wherein a rear side of the upper rail is attached to a lower surface of the inner side roof rail panel, while a front side of the upper rail is bent toward a vehicle compartment and attached to the inner side roof rail panel via a substantially straight bracket that is juxtaposed and parallel to the lower surface of the inner side roof rail panel.

2. The vehicle body of claim 1, wherein the inner side roof rail panel has a horizontal plate portion extending horizontally from an outside of the vehicle compartment toward the vehicle compartment, and a vertical plate portion continued from the horizontal plate portion and erected upwards.

3. The vehicle body of claim 1, wherein the inner side roof rail panel has a horizontal plate portion extending horizontally from an outside of the vehicle compartment toward the vehicle compartment, and a vertical plate portion continued from the horizontal plate portion and erected upwards, the bracket has a first end portion outside the vehicle compartment attached to the horizontal plate portion of the inner side roof rail panel, and a second end portion beside the vehicle compartment attached to the upper rail.

4. The vehicle body of claim 1, wherein the inner side roof rail panel has a horizontal plate portion extending horizontally from an outside of the vehicle compartment toward the vehicle compartment, and a vertical plate portion continued from the horizontal plate portion and erected upwards; the bracket has a first end portion outside the vehicle compartment attached to the horizontal plate portion of the inner side roof rail panel, and a second end portion beside the vehicle compartment attached to the upper rail; and a cover is provided for having an upper end portion attached to the vertical plate portion of the inner side roof rail panel, and a lower end portion extending so as to surround the upper rail and the bracket.

5. The vehicle body of claim 1, wherein the slide door is a rear door disposed behind a front door.

* * * * *